United States Patent [19]
Crawford

[11] 3,856,466
[45] Dec. 24, 1974

[54] FLUID IMPURITY ANALYZER
[75] Inventor: Harry M. Crawford, Port Murray, N.J.
[73] Assignee: Exxon Research and Engineering Company, Linden, N.J.
[22] Filed: May 3, 1972
[21] Appl. No.: 250,086

Related U.S. Application Data
[63] Continuation of Ser. No. 103,766, Jan. 4, 1971, abandoned.

[52] U.S. Cl. .................................. 23/230 R, 73/23
[51] Int. Cl. ...................... G01n 29/02, G01n 33/18
[58] Field of Search ............ 23/230 R; 73/17 A, 23, 73/29

[56] References Cited
UNITED STATES PATENTS
3,164,004  1/1965  King, Jr. ................................ 73/23
3,260,104  7/1966  King, Jr. ................................ 73/23
3,327,519  6/1967  Crawford .............................. 73/23

OTHER PUBLICATIONS
W. H. King, Jr., Research/Development, May, 1969, pp. 28 to 33.

Primary Examiner—Robert M. Reese
Attorney, Agent, or Firm—F. Donald Paris; Donald F. Wohlers

[57] ABSTRACT

A method and apparatus for determining the quantity of non-soluble residue in a fluid, such as a water stream, wherein a sample of a water stream is treated with a volatile organic solvent which sorbs the non-soluble residue in an organic phase. A small measured quantity of the organic phase is deposited on a piezoelectric crystal detector electrically connected with an oscillator circuit, whereupon as the solvent evaporates a change in the resonant frequency of the crystal occurs, which change in frequency is directly proportional to the mass of residue present in the fluid.

11 Claims, 4 Drawing Figures

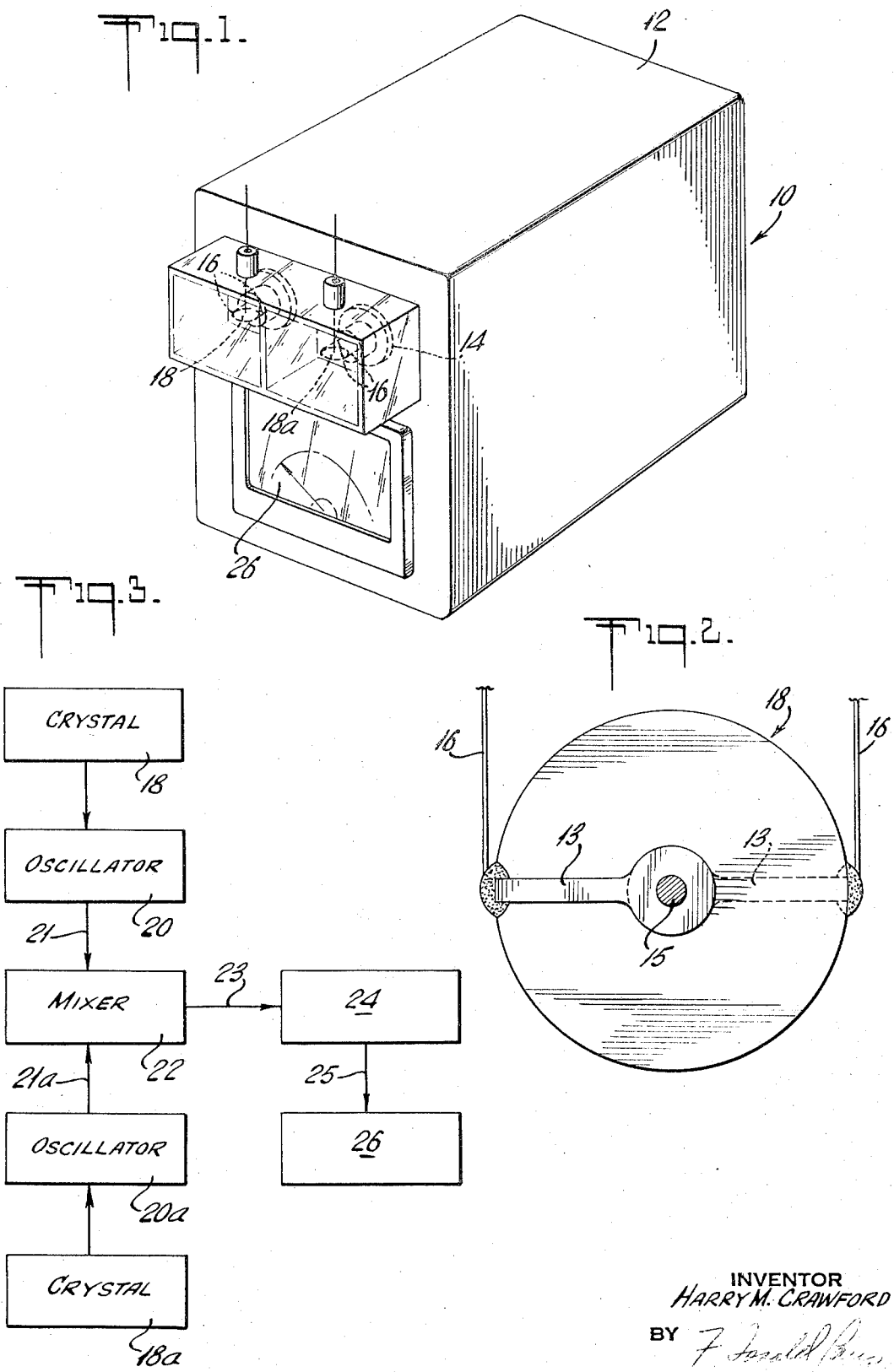

FLUID IMPURITY ANALYZER

This application is a continuation of application Ser. No. 103,766, filed Jan. 4, 1971, assigned to the assignee of the present application and now abandoned.

BACKGROUND OF THE INVENTION

The instant invention relates to a method and apparatus for measuring trace quantities of non-organic matter in a water stream and more specifically, relates to a method and apparatus for determining quantitatively the amount of oil present in a water stream by means of a portable piezoelectric detector.

The problem of water pollution has increased in importance in recent years. Among the many pollutants of large bodies of water, oil and oil products are among the most important. In order to overcome the problem of water pollution, a significant initial step is the determination of the extent of pollution. In the area of oil and water pollution, several methods of attack have been suggested in the prior art. Included in this group of suggested methods of analysis of oil in water are infrared, ultraviolet and combustion testing techniques. Under appropriate conditions, these methods are quite useful and yield satisfactory results. However, in most applications all three methods suffer one major defect, namely, they all require a pre-existing knowledge of the hydrocarbon types present in the oil impurity. Infrared testing techniques, for instance, require calibration based on specific types of hydrocarbons. These hydrocarbon types are extremely varied depending on the geographical source of the crude oil and subsequent processing of same. Thus, the wave length trace of the impurity must be obtained at several known concentrations so that the amount of unknown impurity can be estimated when the sample is tested. In effect, this requires a prior knowledge of the hydrocarbon types (impurities) in a water stream. If per chance the impurities in the stream are not known, their spectra are difficult if not impossible to interpret.

Similarly, ultraviolet fluorescence testing techniques, which are based on the fluorescence of certain types of oil when exposed to ultraviolet light, also require prior knowledge of the molecular constituents of the impurity. In ultraviolet fluorescence techniques, the polynuclear aromatic fraction fluoresces when exposed to ultraviolet light. A quantitative measure of the impurity is related to the fluorescent light emitted by the aromatic fraction and is unfortunately unresponsive to the commonly found paraffins and olefins. The amount of light is also related to the particle size of the aromatic impurities. The smaller the particle size, the greater the light response. Thus, the particle size of the impurities and its polynuclear aromatic content must be previously known in order to obtain meaningful results from this method.

In the combustion method of analysis, a sample containing the impurity is burned to completion. The quantity of oil impurity is measured by the amount of carbon dioxide evolved. The amount of carbon dioxide in turn is measured by an infrared analyzer. In addition to the requirement that the molecular constituency of the impurity be known, further errors are inherent in the fact that any organic material will produce carbon dioxide upon complete combustion. Therefore, other organic matter in a water stream, such as algae, result in additional yields of carbon dioxide and consequently, results in inaccurate determinations.

It is clear that a method that could operate independent of the composition of the type of oil impurity would significantly simplify and increase in accuracy, the determination of the percentage of oil impurity in a water stream. Such a method is a massimetric determination of impurities. In a massimetric determination, the mass of the impurity is determined. It should be appreciated that it is the mass that is measured and not the weight. Thus, a determination made anywhere can be reproduced due to the independence of the method relative to the gravimetric forces present.

A further deficiency of the prior art methods and apparatus is the requirement that most determinations are performed in a laboratory. Laboratory costs usually are quite high due to the cost of setting up a laboratory, including the expensive equipment required, the cost of highly skilled technicians to perform the tests, and the space and electrical power utilities required thereby resulting in a high cost per determination. It is obvious that there exists a dire need for more portable type determination which can be conducted in the field where no special site is required, where unskilled labor can conduct the tests and where small scale inexpensive equipment can be used without requiring external sources of electrical utilities. As will be disclosed hereinafter, the apparatus of the instant invention possesses these latter advantages. On the other hand, the ultraviolet, infrared and combustion methods of the piror art all require laboratory type analyses and/or permanent sources of electrical utilities.

Another disadvantage of the prior art methods of oil analysis in water stream is the inability of these mehtods to pinpoint pollution concentrations at fixed points and times. What this means is simply that a sample taken at a certain time and place cannot be analyzed immediately due to the requirement that the sample first be sent to a laboratory for analysis. It is well known that the concentration of pollutants at any point in a stream or body of water varies with time. Thus, by the time an analysis can be made and action taken to remedy the situation, it oftentimes is too late to correct the situation. Clearly then what is required in the art is a portable apparatus which can analyze a sample within a relatively short time of its collection so as to rapidly analyze conditions at that point in a body of water and to take whatever action, if any, necessary to change existing conditions.

SUMMARY OF THE INVENTION

The method and apparatus of the instant invention is directed to a new and improved type of oil-in-water analyzer which overcomes all the problems associated with the prior art devices.

The apparatus of the instant invention comprises a portable piezoelectric detector which measures the mass of organic impurities in parts per million with a high degree of accuracy in a very short time.

In accordance with the instant invention, an apparatus is provided for measuring trace amounts of organic impurities in a water or polar liquid stream, the preferred embodiment of said apparatus comprising a first piezoelectric material, a second piezoelectric material, a first electronic oscillator circuit means which oscillates as a function of the said first piezoelectric material, a second electronic oscillater circuit means which oscillates as a function of said second piezoelectric material, electronic frequency comparison means for determining the difference in oscillation frequency of said first and said second electronic oscillator circuit means, said difference in oscillation frequency being directly proportional to the difference in mass disposed on the first and second piezoelectric materials.

In accordance with the instant invention, there is provided a method for determining organic impurities in a water or polar stream. The method comprises the steps of mixing a sample of the water stream to be tested with an organic solvent, thereby forming a water and organic two-phase liquid. A sample of the organic phase is extracted and placed on the first piezoelectric material of the apparatus of the instant invention whereupon evaporation of the solvent, the residue mass contains the extracted impurities plus the "pure" solvent impurities. An equal amount of the "pure" organic solvent then is placed on the second piezoelectric material of the apparatus of the instant invention, whereupon evaporation of the solvent the residue is comprised of the "pure" solvent impurities. The amount of extracted organic impurity is then measured as a function of the difference in the oscillation frequencies of the first and second electronic oscillator circuit means of the instant apparatus.

BRIEF DESCRIPTION OF THE DRAWINGS

The instant invention may be better understood by reference to the accompanying drawings wherein:

FIG. 1 is a front perspective view of the portable analyzer constructed and arranged according to the instant invention;

FIG. 2 is a plan view of the piezoelectric crystal employed in the analyzer of the instant invention; and FIG. 3 is a schematic diagram illustrating the electronic circuit of the instant invention.

DESCRIPTION OF THE PREFERRED EMBODIMENT

Figure 4:
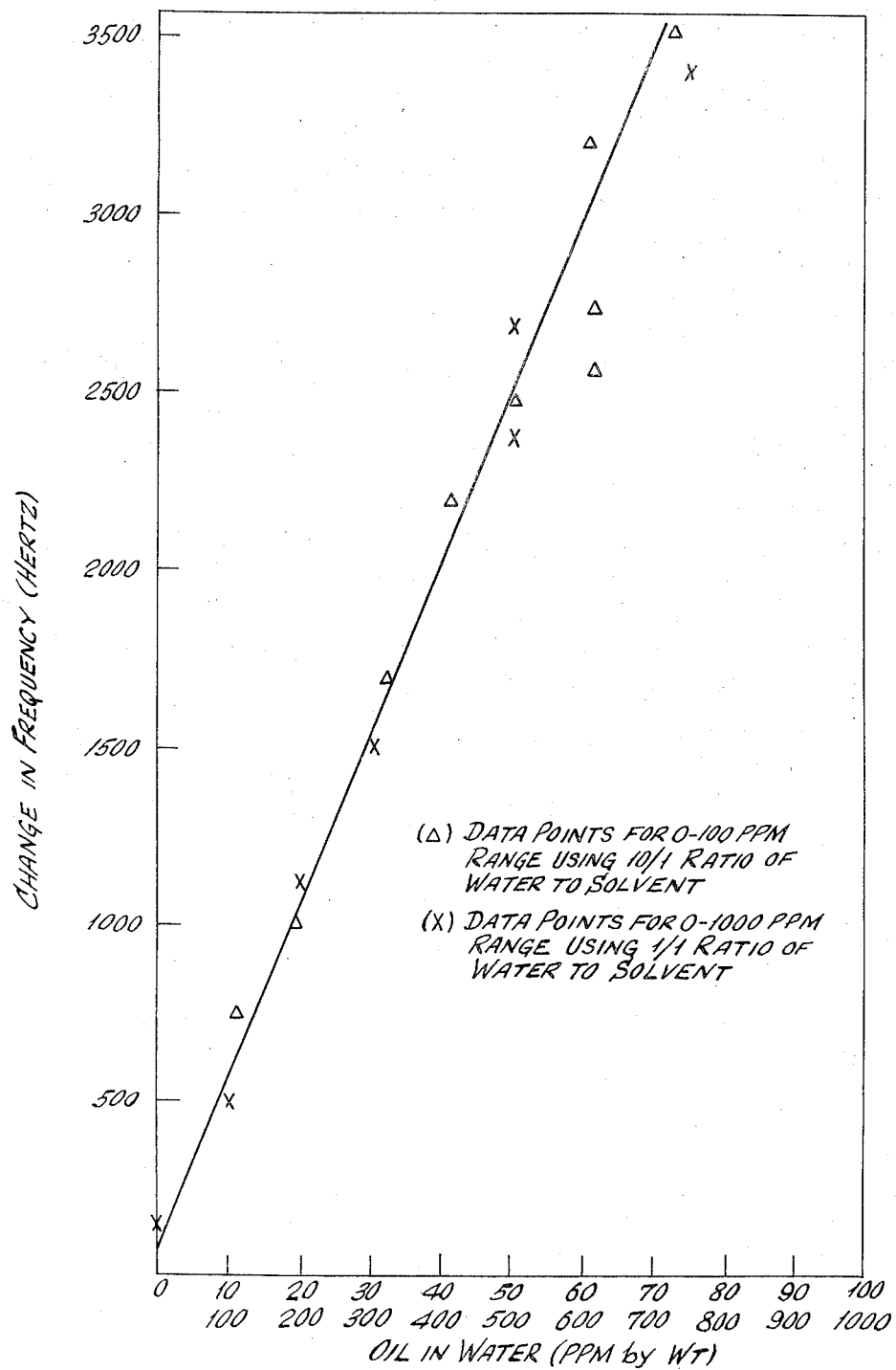
FIG. 4 is a graphical illustration of change in frequency versus parts per million (ppm) oil in water.

According to the instant invention, a water sample(s) suspected of including trace amounts of organic impurities is collected. The samples taken then are mixed with an organic solvent to extract the organic impurities, if any, included in the water sample(s). It has been found that preferably, chlorinated hydrocarbons are most desirable solvents for the instant application. Chlorinated hydrocarbons have excellent solvent power, that is, they extract practically all hydrocarbon impurities contained in a water stream. In addition, they have very low solubility in water. Thus, these two properties result in the extraction of substantially all impurities in the solvent phase. Among the chlorinated hydrocarbons used trichloroethylene, perchloroethylene, carbon tetrachloride and methylene chloride are most commonly used for this solvent extraction operation. Of these, methylene chloride is most preferred since not only does methylene chloride possess the properties enumerated above, but additionally is non-flammable and has low vapor toxicity.

When methylene chloride is employed as the solvent, equal volumes of the sample and the solvent are used in mixing an extraction operation. Such a procedure is effective if the sample contains oil, organic impurities, or hydrocarbons in the ranges of up to 1,000 parts per million (ppm) by weight. If the samples are suspected of containing significantly smaller amounts of oil, then the ratio of solvent to sample is decreased. Thus, it has been found that if a sample contains only up to 100 ppm of impurity, then 1 volume of solvent is added to 10 volumes of sample.

It should be appreciated that the foregoing described extraction step is a highly effective method of not only extracting all the oil-like impurities in the concentrated form, but in addition provides for rapid separation of the impurity. It has been calculated that the average time for solvent evaporation after disposal of a sample of the organic phase on a piezoelectric material, which will be described in greater detail below, is about one minute. Thus, the use of a solvent not only results in a concentration of impurities such that the resultant amounts of oil found are increased, which in turn result in more accurate determination, but the time for other liquid evaporation to occur is markedly decreased. A final advantage of the use of an organic solvent resides in the inaccurate results that occur when water-soluble salts are considered. Typically, water samples contain water-soluble salts which remain after vaporization of the water. The weight of these salts are enough to result in errors in that the salts may represent a significant fraction of the total organic impurities present. By the method of the instant invention the water-soluble salts distribute themselves entirely in the water phase since such salts are almost totally insoluble in a solvent such as methylene chloride.

Turning now to FIG. 1, the analyzer apparatus of the instant invention is disclosed. The analyzer, generally indicated at 10, comprises a light-weight, portable device with a handle provided to facilitate its manipulation. The box internally includes the necessary electrical wiring and electronic circuits which will be described in greater detail hereinafter. The box comprises a frame or cover means 12, preferably a machined metal plate, and having a plurality of openings 14 formed in its front face. Electrical connecting means 16 are fixedly secured in these openings so that the internal electronic circuits (not shown in FIG. 1) may operably be connected with a pair of piezoelectric materials or slabs 18.

Referring now to FIG. 2, the piezoelectric materials 18 of the instant invention are disclosed. The piezoelectric materials 18, according to the preferred embodiment illustrated in FIG. 2, each comprise a quartz crystal. It should be appreciated that for purposes of the present invention the characteristic of the piezoelectric crystal relied upon is that it develops an electrical potential when subjected to mechanical pressure and vice versa. Although quartz most often is employed in piezoelectric applications, it should be appreciated that other materials, such as tourmaline and Rachel salts, also exhibit piezoelectric properties and also may be employed.

The frequency at which a piezoelectric material, such as quartz crystal 18, oscillates is dependent on several variables. These include the thickness of the crystal, the electrode structure, the characteristics of the oscillating circuit to which the crystal is connected, the temperature, and in the case of crystals, the particular axis along with it is cut. This frequency, however, changes with corresponding change in the mass of the electrode. The slightest change in the electrode mass of an AT cut piezoelectric crystal will produce a detectable change in its resonant frequency. Thus, it is generally accepted that a piezoelectric detecting circuit can detect a weight addition to the electrode surface of as little as $10^{-13}$ to $10^{-9}$ grams. Thus, the electrode surface of a piezoelectric crystal comprises an excellent device for determining accurately according to the present invention the amount of residue, which may amount to a negligible mass, in a water stream. This property of the cyrstal whereby its frequency varies with the additional weight placed on its electrode surface becomes even more apparent when the frequency of the oscillator circuit in cycles per second (cps) graphically is illustrated as a function of the additional weight placed on the crystal. (Typical of such a graph is that shown in FIG. 4.) In this graph the weight added to the crystal is plotted along the abcissa in parts per million of oil in the water while the change in crystal frequency is plotted along the vertical axis. It has been found, and is so illustrated in FIG. 4, that the difference frequency of the detector circuit is a substantially linear function of the mass added to the piezoelectric device. This results in the advantage that the crystal can be calibrated quite simply by as little as two data points.

Each piezoelectric crystal 18 includes two electrodes 13 suitably bonded to the crystal. As illustrated in FIG. 2, each electrode, which is connected electically to the electrical connecting means 16, comprises a metallic coating. Preferably, the metal used has high electrical conductivity and in a preferred embodiment may comprise gold in contact directly with the quartz and a nickel coating over the gold to make the exposed surface more resistant to abrasion such as one might encounter in normal use. Alternatively, silver may be employed instead of gold. In a preferred embodiment the crystal is cylindrical having a diameter of approximately 12 mm. The sample is disposed onto one of the electrodes in the center of the crystal 18. It should be appreciated that the samples placed on the crystals should always be disposed in the same relative position thereon. Failure to place the sample in the same relative position results in different moments which in turn results in different frequencies. Thus, in order to be sure of uniformity the sample is disposed in the center of the crystal. In FIG. 2 the center portion on which the sample is disposed is designated as 15. A hypodermic needle may be used to collect the sample from the organic phase of the mixture and then dispose the sample on the crystal. A suitable holding device (not shown) may be attached to the device 10 into which the hypodermic needle may be inserted and held in place. The holding device would be disposed so as to permit the accurate disposition of the fluid sample onto the center of the electrode of the crystal 18. Alternatively, in the case of a continuous type operation an artist's airbrush type device may be employed. An airbrush is a spray method which disposes a measured quantitiy of liquid onto a predetermined location on a surface. In the preferred embodiment illustrated in FIG. 2 the sample is disposed in the center of the crystal over a diameter of approximately 3 mm.

FIG. 3 is a block schematic diagram representing the electronic circuitry necessary for operation of the device according to the instant invention. The crystal 18 determines the resonant frequency of the oscillator circuit 20. Similarly, a reference crystal 18a, the function of which will be described in greater detail hereinafter, determines the resonant frequency of the oscillating circuit 20a. The oscillator circuits 20 and 20a produce a radio frequency signal, usually about 9–27 megahertz, denoted as 21 and 21a, respectively. The two signals 21 and 21a are combined in a conventional mixer or other suitable circuit 22 that is capable of providing an indication of the frequency delta between these signals. The difference between the two signals comprises the output frequency of the mixer circuit 22 in the form of an audio frequency signal 23 usually about 1 to 10,000 hertz. The signal 23 then is transmitted to a standard frequency converter 24. The converter 24 converts the audio frequency signal into an analog or a digital signal 25. The analog or digital signal 25 is transmitted to an output circuit 26 in either analog or digital form and more commonly, the output comprises an analog signal which manifests itself as a needle indicator of a conventional microammeter meter. Alternatively, for continuous operations a recorder may be used. By converting the signal 23 into a suitable digital signal the converter 24 then will emit a digital signal 25 which is available for reading with a frequency counter at the output 26. It should be appreciated that the digital method requires an auxiliary frequency counter and could only be used where conventional power sources are readily available. In FIG. 1 the detector device 10 is shown to include an analog meter readout of the microammeter type, which comprises the output 26.

It should be appreciated that the oscillator circuits employed in the instant invention are well known in the art and obviously various suitable standard oscillator circuits may be employed. It should be emphasized that the particular type of oscillator circuit with which the crystal is connected is not critical. Such well known commercially available oscillators may comprise any one of a variety, such as a Hartley oscillator, a tuned grid-tuned plate oscillator and other like conventional oscillator circuits. Similarly, the mixer circuit 22 and the audio frequency signal converter 24 are well known in the art and thus, any known mixer circuit and converters may be employed for purposes of the present invention.

In operation the instant invention comprises the gathering of samples from a water body, which is followed by the selection of an amount representative of the sample. A measured representative amount is combined with a measured amount of chlorinated hydrocarbon solvent. As stated above, methylene chloride is the preferred solvent. The sample and solvent then are mixed and left to settle. Methylene chloride has a specific gravity of 1.3 to 1.4 and thus, the organic solvent phase will be the bottom phase since its specific gravity is higher than that of water. The average elapsed time for solvent addition and mixing has been found to be about 2 minutes, which includes the time for the phase separation. A removal means then is used to remove the organic sample containing the organic impurities and the solvent. As stated above, according to the preferred embodiment, a hypodermic syringe may be used to remove a very small sample, usually microliters, of the organic phase. A measured amount of sample, preferably 1 to 10 microliters, is then placed on one of the two piezoelectric crystals 18. As was described above, the hypodermic needle may be inserted in a holding device which insures that the drops disposed on the crystal 18 are accurately disposed in the center portion 15 thereof. Next, a sample of the same volume, which includes only the solvent, is disposed on the second of the crystals 18. This is done in order to insure that the impurities present even in the highest grade of solvent do not affect the results. Thus, if there are any non-volatile impurities in the solvent, the same amount of the non-volatile matter is present on both crystals and will cancel each other out. It is within the scope of the present invention to employ a single crystal only. However, the use of a single crystal may result in the offset such as illustrated in FIG. 4 and therefore, it is preferred to employ two crystals for increased accuracy. Should a single crystal be used, it still would be necessary to compare its resonant frequency with a second crystal connected internally in the other oscillator circuit. It has been found that in research grade methylene chloride there are typically 20 ppm of non-volatile matter in a typical sample of solvent. This is indicated in FIG. 4 where data were taken while employing a single crystal by the fact that at zero ppm oil there is still a measured change in frequency (the offset) caused by the impurities in the solvent. In the preferred embodiment, which employs two crystals, these impurities are measured by the reference crystal and automatically substracted from the final reading. The hypodermic needle holders, which may be employed to direct the sample to the center 15 of the crystal 18 also may be provided with automatic means to insure that a pre-determined amount of the sample is disposed on the crystal. It is obvious that it is most important to know the exact volume of sample disposed on the crystal. It has been found that the average elapsed time for sample withdrawal and placement onto the crystal is about one minute.

it should be appreciated that the entire procedure described heretofore alternatively may be performed in a continuous automatic fashion. There are many methods for adding a fixed volume of a solvent to a fixed volume of a sample and then mixing the two components. Thus, solvent addition and mixing easily may be automated. In addition, sample withdrawal and placement may be automated by the use of an artist-type airbrush such as described above.

The sample disposed on the first piezoelectric crystal 18 and the reference sample, which comprises the equal volume of solvent placed on the second crystal 18a, are allowed approximately one minute for solvent evaporation. This step requires no external driving force since methylene chloride immediately vaporizes at room temperature and atmospheric pressure. Immediately upon vaporation of the solvent a reading is derived either by the needle indicator shown, the chart recorder or a frequency counter. In order to insure accurate results in the next run the crystals 18 and 18a and specifically, the electrode surface 15 upon which the sample and solvent are disposed, are cleaned with a wash solvent. In most cases, acetone is used as the washing agent. Crystal cleaning takes on the average about one minute. Thus, the entire procedure from solvent addition to crystal cleaning takes an average of about 5 minutes. It follows then that in only 5 minutes a determination can be made of the oil concentration in a water stream. Assuming that it takes approximately 5 minutes to get a sample and to prepare it for mixing, within 10 minutes a non-skilled operator may determine the concentration. The importance of a quick determination by a non-skilled operator is illustrated by the following typical example. Large crude oil tankers having a discharged a cargo of oil must fill their tanks with water ballast for the return voyage. Just prior to reloading another cargo of oil the ballast water is discharged to the sea (sometimes in port) with occasional pollution of said sea or port with oil contained in the ballast water. A seagoing tanker is a good example of a location where laboratory facilities and skilled personnel are not readily available yet international conventions have limited the oil content of discharged ballast water to 100 ppm. According to the present invention an unskilled operator can take samples of the ballast water to insure that the water contains less than 100 ppm of oil before it is dishcarged overboard. Cargo compartments showing over 100 ppm oil are pumped to an onboard slop tank for further separation of the oil. Thus, by use of the subject invention pollution of the open seas effectively can be reduced and avoided. A distinct advantage of the present invention over conventional devices that may be located onboard the ship, so that the subject invention is mass sensitive and is not influenced by the roll and a pitch of the ship (that is, the orientation to the earth's gravimetric field). A further example wherein the subject invention has direct application is in the testing of effluent water streams from chemical and petroleum plants. Here the testing must be performed in a remote area on a typical settling pond that discharges into an effluent stream. Some local government bodies require that this effluent contain less than 3 ppm oil and prior to the present invention samples of said effluent had to be sent to the laboratories for analyses with the accompanying delays and previously discussed inaccuracies. According to the present invention an unskilled operator can determine the oil level onsite and stop all discharges that exceed local criteria or divert these discharges to another pond for secondary treatment. Also, the present invention has utility as a means for calibrating continuous onstream analyzers and verifying the data obtained.

Although a preferred embodiment of the instant invention has been disclosed it should be appreciated that the method and apparatus of the instant invention should not be limited to the preferred embodiment as disclosed and illustrated. Rather, the claims below should be interpreted to include other embodiments which do not depart from the scope and spirit of the invention herein described.

What is claimed is:

1. A method for determining the organic impurity content in a fluid comprising the steps of:
   a. mixing a sample of said fluid with an organic solvent, whereby a two-phase liquid mixture is formed including an impurity-containing organic phase;
   b. extracting a sample of the organic phase containing the organic impurity;
   c. disposing an amount of the extraced sample on at least a first crystal having a predetermined resonant frequency and operably connected with first oscillator circuit means;
   d. providing second oscillator circuit means having a predetermined resonant frequency; and
   e. determining the amount of organic impurity in said organic solvent as a function of the difference in frequency between said first and second oscillator circuit means.

2. The method of claim 1 wherein said fluid comprises a water stream.

3. The method of claim 1 wherein following step (c), including the further step of disposing an amount of organic solvent equal to that provided in step (a) on a second crystal having a predetermined resonant frequency and operably connected with said second oscillator circuit means.

4. The method of claim 1 wherein said organic solvent comprises a chlorinated hydrocarbon.

5. The method of claim 1 wherein said extracted sample is disposed centrally on said first crystal.

6. A method for determining organic impurities in a water stream comprising the steps of:
   a. mixing a sample of said water stream with an organic solvent, whereby a water and impurity containing organic two-phase liquid mixture is formed;
   b. extracting a sample of the organic phase containing said organic impurities;
   c. disposing said extracted sample on a first piezoelectric crystal operably connected to first electronic oscillator circuit means;
   d. disposing a mass of said organic solvent equal to the amount of said organic solvent contained in said organic phase sample on a second piezoelectric crystal operably connected to second electronic oscillator circuit means; and
   e. determining the amount of organic impurities in said organic solvent as a function of the difference in frequency between said first and second electronic oscillator circuit means.

7. The method according to claim 6 wherein the sample extracted in step (c) and the mass of organic solvent in step (d) are disposed centrally on said first and second piezoelectric crystals, respectively.

8. A method for determining the impurity content in a fluid comprising the steps of:
   a. mixing a sample of said fluid with a solvent immiscible with said fluid and having the capacity to selectively extract the impurity from the fluid sample containing the impurity, whereby a two-phase liquid mixture is formed including an impurity-containing solvent phase;
   b. extracting a sample of the solvent phase containing the impurity;
   c. depositing a predetermined amount of the extracted sample on a first crystal having a predetermined resonant frequency;
   d. evaporating the solvent from said crystal to leave a residue of the impurity on said crystal;
   e. comparing the frequency of said crystal subsequent to completion of step (d) with a reference frequency; and
   f. determining the amount of impurity present in said fluid sample as a function of the difference between the reference frequency and the frequency of said crystal with said residue.

9. The method of claim 8 wherein said fluid comprises a water stream and said solvent is a water-immiscible liquid having the capacity to extract the impurity from water containing the impurity.

10. The method of claim 8 wherein the impurity is organic.

11. A method for determining the impurity content in a water stream comprising the steps of:
   a. mixing a sample of said water stream with a water-immiscible solvent having the capacity to extract the impurity from water containing the impurity, whereby a water and impurity containing two-phase liquid mixture is formed;
   b. extracting a sample of the phase containing said impurity;
   c. depositing said extracted sample on a first piezoelectric crystal having a predetermined resonant frequency;
   d. depositing a mass of said solvent equal to the amount of said solvent contained in said impurity containing phase on a second piezoelectric crystal having a predetermined resonant frequency;
   e. evaporating the solvent from each of said crystals so that a residue of any impurity is left on said first crystal;
   f. comparing the frequencies of said crystals subsequent to completion of step (e); and
   g. determining the amount of impurity present in said water sample as a function of the difference between the frequencies of said first and said second crystals subsequent to completion of step (e).

* * * * *